Jan. 26, 1965 A. C. HANSEN, JR 3,167,399
RADIAL FLOW REACTOR
Filed May 8, 1962
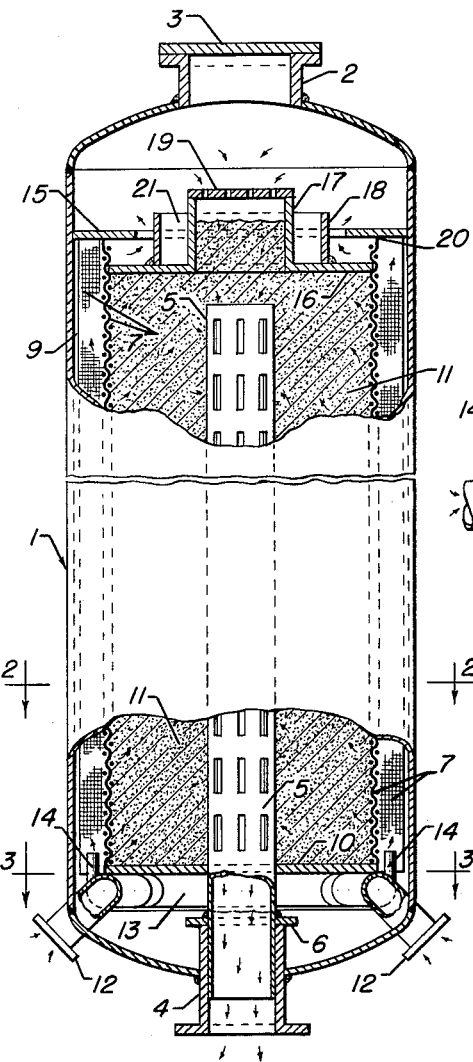
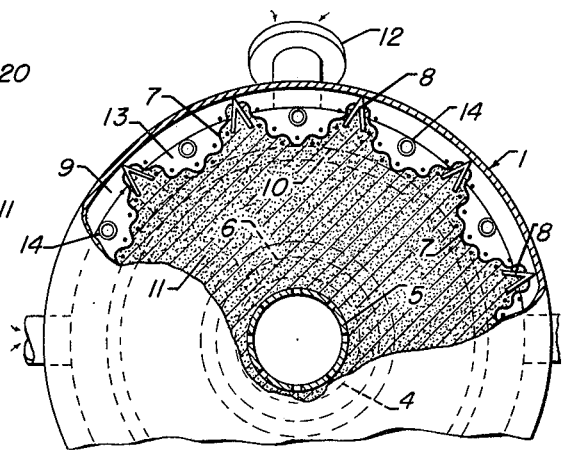
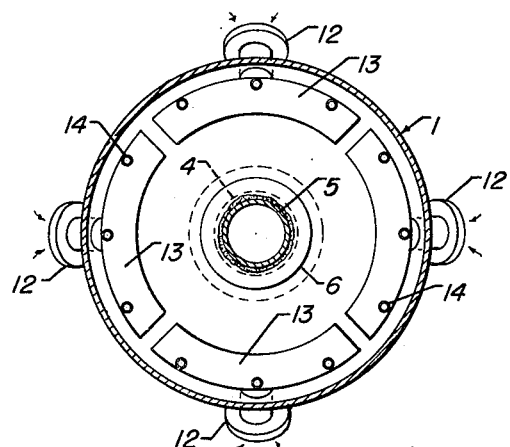
INVENTOR:
Andrew C. Hansen,Jr.
BY:
Chester J. Giuliani
Philip J. Liggett
ATTORNEYS 3,167,399
RADIAL FLOW REACTOR
Andrew C. Hansen, Jr., Surrey, England, assignor to Universal Oil Products Company, Des Plaines, Ill., a corporation of Delaware
Filed May 8, 1962, Ser. No. 193,285
3 Claims. (Cl. 23—288)

This invention relates to radial flow reactors commonly employed in the contacting of fluid reactants with a confined bed of catalyst particles or other subdivided contact material. More particularly, the present invention is directed to an improved radial flow reactor designed to minimize plugging of the catalyst retaining screen by catalyst fines, rust, dust and other finely divided foreign matter.

In the radial flow or annular type of reactor, the particle-form catalyst bed is disposed between an outer vertically elongated circular screen or perforated baffle and an inner axial perforated conduit or centerpipe; the screen and centerpipe are concentrically mounted within a vertical cylindrical vessel. Fluid reactant enters the top of the vessel, flows downwardly along the outer periphery of the annular bed between screen and vessel wall, and passes radially inward through the bed to the centerpipe which conducts effluent out of the vessel through a lower outlet. Alternately, the vessel may be inverted whereby reactant enters the bottom of the vessel and is removed through a centerpipe communicating with an upper outlet.

A presumed advantage of the radial flow reactor over other types such as the downflow reactor is reduced clogging of the bed by foreign matter which in the latter case results in increased pressure drop with time and nonuniform contact due to channeling of the fluid stream. Unfortunately, with radial flow contactors of conventional design, such advantage has proven in practice to be largely illusory, unless the reactor feed is always free from entrained foreign materials.

The radial flow reactor of necessity provides nonlinear space velocity with respect to distance between inlet and outlet, since the cross-sectional area of the bed perpendicular to the direction of fluid flow decreases with decreasing vessel radius. If the reactor is properly designed and loaded, the space velocity is nevertheless circumferentially uniform; i.e., equal space velocities will obtain at all points of the bed which are radially equidistant from the longitudinal axis of the reactor. However, flow stability of radial flow contactors is highly susceptible to peripheral discontinuities in the flow path. The theoretical flow pattern is easily disrupted by obstructions to flow in an outer region of the bed, particularly in the catalyst retaining screen, and is most difficult to achieve under actual operating conditions. The perforations of the outer catalyst retaining screen are prone to becoming plugged with catalyst fines, metal scale, dust and similar solid matter either entrained in the fluid feed or dislodged from a catalyst bed, heater tubes, or vessel internals. Such plugging rapidly leads to channeling through the bed and development of dead spots within the contact mass, which in turn causes overreaction of some portions of the reactant and underreaction of others, as well as a generally haphazard deactivation of various regions of the catalyst bed. Efforts to minimize such effects include dumping of catalyst and cleaning of screen assemblies a number of times before the catalyst must be finally removed from the unit for renewal.

It is therefore a principal object of the present invention to provide a radial flow reactor of novel design whereby the catalyst retaining screen thereof is maintained substantially free of deposits which would otherwise clog the perforations of the screen. A further object of the invention is to provide a fines disengaging and accumulation zone in the reactor wherein foreign matter suspended in the fluid feed is separated and trapped upstream from the catalyst bed proper.

One embodiment of this invention relates to a reactor comprising a pressure-tight vessel having a cylindrical vertical wall, a perforate centerpipe within the vessel extending upwardly from the lower portion of the vessel and terminating below the upper end of the vessel, a vertically extending perforate particle retaining means or screen member within the vessel proximately spaced from said vertical wall to form with the latter a longitudinal fluid passageway, said screen member being substantially coextensive with the perforated length of said centerpipe but extending above the upper end of the centerpipe and forming therewith an annular particle retaining space, a horizontal peripheral fluid distribution means disposed in the lower portion of the vessel and having a number of circumferentially spaced ports therein communicating directly with said longitudinal passageway, an annular baffle member sealing off the upper end of said longitudinal passageway, a second baffle member spaced below the annular baffle member and extending from said screen member across said particle retaining space, the central region of said second baffle member being perforate and spaced above the upper end of said centerpipe and the remaining outer region thereof being imperforate, and conduit means separately connecting said centerpipe and said fluid distribution means with the exterior of the vessel.

The above-described structure differs from conventional radial flow contactors in several material respects. First, prior art contactors typically provide feed downflow whereas in the present invention the fluid reactant is introduced into the lower portion of the vessel and is peripherally distributed into the longitudinal passageway defined by the particle retaining screen and the vessel wall. The reactant flows upwardly while concurrently portions thereof flow radially through the screen, into the catalyst bed, and thence out through the centerpipe. Second, the longitudinal passageway of prior art contactors is dead-ended so that the total feed flow which enters the longitudinal passageway ultimately passes radially through the particle retaining screen; with such arrangement, that portion of the particle retaining screen which is most remote from the feed inlet lies in a stagnant or quiescent zone and is thus particularly susceptible to plugging by foreign matter. However in the present invention, the particle retaining screen extends above the active length of the catalyst bed to provide an upper circumferential passageway through which a portion of the feed is by-passed into an upper particle disengaging and collection zone. Thus, a slipstream of reactant is caused to sweep upwardly past all regions of the particle retaining screen, including the uppermost part thereof, at a superficial velocity which is sufficient to suspend and transport dust and fines dislodged from the screen into the particle disengaging zone. The feed slipstream undergoes a 180° reversal of direction in the particle disengaging zone and then passes downwardly through a perforate baffle into the catalyst bed. In this manner, the particle retaining screen of the reactor is virtually self-cleaning, with the result that a much more uniform and stable operation is achieved.

The structure and arrangement of the present invention may be more clearly understood upon reference to the accompanying drawing, which is presented as illustrative of its preferred construction but is not intended to be limiting upon the broad scope of this invention.

FIGURE 1 of the drawing is a sectional elevation view of the reactor of this invention.

FIGURE 2 is an enlarged sectional plan view of the reactor taken along line 2—2 of FIGURE 1.

FIGURE 3 is a sectional plan view of the reactor taken along line 3—3 of FIGURE 1.

With reference now to FIGURE 1, there is indicated a vertically positioned vessel having a vertical cylindrical wall portion 1. An upper centrally positioned flanged nozzle 2, normally closed by means of blind flange 3, furnishes access to the vessel interior for purposes of catalyst loading and installing and removing the vessel internals. A lower axial flanged nozzle 4 constitutes the vessel outlet which is connected to the usual process piping during operation. A perforate centerpipe 5 is axially positioned within the vessel and extends upwardly from nozzle 4 a substantial distance but terminates below the upper end of the vessel; the term "perforate" as employed in this application connotes a plurality of perforations, such as holes or slots, disposed uniformly or nonuniformly in and along the active region of the structural member in question for purposes of promoting good fluid distribution or collection, as distinguished from a single hole or set of randomly distributed holes utilized for purposes other than fluid distribution. The centerpipe 5 is inserted a short distance into nozzle 4 and is supported thereon by means of a seat ring 6 welded to the lower outside surface of centerpipe 5. An outer particle retaining screen member 7 extends vertically within the vessel and is generally coextensive with the perforated length of centerpipe 5.

Although screen 7 may in its simplest form be cylindrical whereby to form with wall 1 an annular longitudinal passageway, a preferred construction therefor is the so-called "scallop" screen arrangement more clearly indicated in the plan view of FIGURE 2. In the scallop screen construction there is provided a number of elongated arcuate screen sections which are butted edge-to-edge around the circumference of the vessel and are connected at their edges to wall 1 by means of V-clips 8 arranged in vertical rows; the completely assembled screen 7 thus takes the form of a generally cylindrical member having a number of circumferentially spaced longitudinal cusps or scallop portions therein which contact vertical wall 1 to form a plurality of longitudinal fluid passageways 9. The scallop sections are preferably symmetrical so that passageways 9 have equal transverse cross-sectional areas. Instead of a woven wire screen, the particle retaining means may alternately be constructed of perforated curved baffle sections. Screen 7 and centerpipe 5 together define an annular particle retaining space adapted to contain a fixed bed of catalyst particles, such as catalyst bed 11; the lower portion of the particle retaining space is closed by means of an annular plate 10 whereby to provide support for the catalyst bed.

With reference to FIGURES 1, 2 and 3, a peripheral feed distribution means such as a distributor ring, which may consist of one or more arcuate sections 13 each separately fed from outside the reactor (as shown in FIGURE 3), is disposed immediately beneath plate 10 and positioned so that it overlaps the lower open ends of passageways 9. One or more flanged feed inlet nozzles 12 extend through the lower wall of the vessel and connect with their respective distributor ring sections 13. A plurality of upwardly directed circumferentially spaced nozzles 14 is attached to the upper surfaces of ring sections 13 and is arranged such that at least one nozzle is provided for at each passageway 9. Nozzles 14 extend a short distance into their respective passageways 9, thus providing direct fluid communication between the interiors of ring sections 13 and passageways 9. If desired, two or more nozzles may be provided for each passageway 9; alternately, in lieu of nozzles, ring sections 13 may simply have a number of circumferentially spaced ports or openings in their upper surfaces. In any event the nozzles or ports, as the case may be, are sized to provide equal pressure drops so that the fluid flow to each passageway 9 is substantially identical. It is, of course, not necessary that the peripheral feed distribution means comprising sections 13 be perfectly toroidal in shape; for example, it may be constructed of a plurality of short straight sections of pipe arranged to achieve the same function as a perfectly circular distributor ring or ring sections.

It will be observed in FIGURE 1 that the particle retaining screen extends a short distance above centerpipe 5 and, more particularly, above catalyst bed 11 itself. The uppermost ends of passageways 9 are sealed off by means of an imperforate horizontal annular baffle member 15. A second horizontal annular baffle member 16 is spaced below baffle 15 and extends radially inward from screen 7 across the outer portion of the top of bed 11. An axially positioned open-ended vertical casing 17 extends upwardly from baffle 16 and is closed by means of a perforated cover plate 19 above the upper end of centerpipe 5, the latter being closed or fitted with a fine mesh screen. The volume within casing 17 is then substantially filled with catalyst. A vertical annular baffle 18 may be installed, if desired, for better flow regulation and also to provide a quiescent fines separation zone as hereinafter explained.

The directional arrows of FIGURE 1 indicate the direction of flow of fluid or gaseous reactants. Feed is admitted to the vessel through inlet nozzles 12 and distributor ring sections 13. Equal quantities of feed are discharged from nozzles 14 into respective passageways 9; within each passageway 9 the fluid reactants flow upwardly, sweeping the pores of screen 7 free of catalyst fines, rust, dust, etc., while simultaneously portions of the feed pass radially through screen 7 and bed 11 to be collected by centerpipe 5 and discharged through outlet nozzle 4. A predetermined portion of the upflowing feed, however, is initially bypassed; that is, it does not enter bed 11 radially but rather escapes the upper ends of passageways 9 through the free area 20 of screen 7 between baffles 15 and 16. The quantity of feed so bypassed should be at least sufficient to entrain and carry with it the finely divided foreign matter dislodged from screen 7, and is governed primarily by the free area of perforated plate 19 and to a lesser extent by the free area 20 of screen 7 and the lateral spacing of baffle 18 from baffle 15; the requisite physical dimensions may be determined in any particular case in accordance with the conventional pressure drop formulas. By way of example only and not with the intent of limiting the invention, it may be stated that a bypass rate of from 1–5% of the total feed rate will ordinarily suffice to enable the scallop screen assembly to remain self-cleaning, although a greater or lesser design percentage may be used where desired. When the bypass stream thus passes through circumferential passageway 20 and enters the upper fines disengaging zone, it undergoes velocity reduction as well as a 180° reversal of direction. The suspended fines settle out and accumulate in the relatively quiescent fines separation zone 21 between casing 17 and baffle 18. The fines-free bypass stream now flows downwardly through perforated plate 19 and longitudinally through catalyst bed 11. The additional volume of catalyst provided within casing 17 insures that the bypass stream will enjoy adequate contact time with the catalyst prior to its removal through centerpipe 5.

The various baffle means associated with the fines disengaging zone may have various other geometrical shapes than those specifically illustrated. For example, baffles 15 and 16 may be inclined or curved instead of horizontal; baffle 16 may be positioned below centerpipe 5 instead of above it in which event casing 17 would be more elongated so as to terminate above the centerpipe; alternately, baffle 16 may be simply a flat plate with casing 17 omitted. The important consideration is that the central region of baffle 16 should be perforate and spaced above the upper end of centerpipe 5, and the remaining outer region of baffle 16 should be imperforate, although the latter may be spaced either above or below the upper end of centerpipe 5. By this means the solids entrained in the bypass stream are trapped upon the upper imperforate surface of baffle 16.

The present invention may be utilized in any process wherein it is desired to contact fluids with a confined bed of solid contact material such as, for example, catalytic reforming of low octane naphtha, hydrodesulfurization of naphtha or cycle stock, hydrocracking of heavy oils, and catalytic polymerization, hydrodealkylation and isomerization reactions, etc. In addition to catalytic processes, this reactor may of course be adapted for other non-catalytic operations such as water treating with ion exchange resins, liquid-solid extraction and the like.

It will further be appreciated that the present design is particularly advantageous where it is desired to effect in situ regeneration of spent catalyst. The regeneration of coked platinum reforming catalyst, for example, involves treating the catalyst with a high temperature oxidizing atmosphere usually comprising air or steam or a mixture thereof. Such regenerating medium is highly conductive to rust and scale formation through the oxidation of associated process piping and various non-alloy reactor internals. Under these conditions a conventional radial flow reactor soon becomes plugged and its catalyst contaminated with metal oxides. The present invention largely obviates this difficulty by providing an upflowing slipstream of regeneration gases to sweep the catalyst retaining screen clean in the manner previously described with respect to onstream operation. A further advantage of this invention is that the foreign material which accumulates on top of the catalyst bed can be readily removed from time to time without removal of the catalyst from the vessel.

I claim as my invention:

1. A reactor comprising:
   (1) a pressure-tight vessel having a cylindrical vertical wall;
   (2) a perforate centerpipe within the vessel extending upwardly from the lower portion of the vessel and terminating below the upper end thereof;
   (3) a vertically extending perforate particle retaining means within the vessel proximately spaced from said vertical wall to form with the latter a longitudinal fluid passageway, said particle retaining means being substantially coextensive with the perforated length of said centerpipe but extending above the upper end of the centerpipe and forming therewith an annular particle retaining space;
   (4) horizontal peripheral fluid distribution means disposed in the lower portion of the vessel and having a number of circumferentially spaced ports in the distribution means communicating directly with said longitudinal passageway;
   (5) an annular baffle member extending inwardly from said vertical wall across the top of said perforate particle retaining means and sealing off the upper end of said longitudinal passageway;
   (6) a second baffle member spaced below the first-mentioned annular baffle member and extending inwardly from said particle retaining means across said particle retaining space, said second baffle member comprising an imperforate horizontal annular plate having an axially positioned open-ended vertical casing extending upwardly from the plate to a point above the upper end of said centerpipe with a perforated closure member being disposed across the casing above the centerpipe;
   (7) a vertical annular baffle extending upwardly from said horizontal annular plate through the opening of said first-mentioned annular baffle member and spaced from said vertical casing; and
   (8) conduit means separately connecting said centerpipe and said fluid distribution means with the exterior of said vessel.

2. A reactor comprising:
   (1) a pressure-tight vessel having a cylindrical vertical wall;
   (2) a perforate centerpipe within the vessel extending upwardly from the lower portion of the vessel and terminating below the upper end thereof;
   (3) a vertically extending substantially cylindrical particle retaining screen within the vessel, said screen having a number of circumferentially spaced longitudinal cusps therein which contact said vertical wall to form therewith a number of longitudinal fluid passageways, and said screen being substantially coextensive with the perforated length of said centerpipe but extending above the upper end of the centerpipe and forming therewith an annular particle retaining space;
   (4) horizontal peripheral fluid distribution means disposed in the lower portion of the vessel and having a number of circumferentially spaced ports in the distribution means each communicating directly with one of said longitudinal passageways;
   (5) an annular baffle member extending inwardly from said vertical wall across the top of said screen and sealing off the upper ends of said longitudinal passageways;
   (6) a second baffle member spaced below the first-mentioned annular baffle member and extending inwardly from said particle retaining screen across said particle retaining space, said second baffle member comprising an imperforate horizontal annular plate having an axially positioned open-ended vertical casing extending upwardly from the plate to a point above the upper end of said centerpipe with a perforated closure member being disposed across the casing above the centerpipe;
   (7) a vertical annular baffle extending upwardly from said horizontal annular plate through the opening of said first-mentioned annular baffle member and spaced from said vertical casing; and
   (8) conduit means separately connecting said centerpipe and said fluid distribution means with the exterior of said vessel.

3. A reactor comprising:
   (1) a pressure-tight vessel having a cylindrical vertical wall;
   (2) a perforate centerpipe within the vessel extending upwardly from the lower portion of the vessel and terminating below the upper end thereof;
   (3) a vertically extending substantially cylindrical particle retaining screen within the vessel, said screen having a number of circumferentially spaced longitudinal cusps therein which contact said vertical wall to form therewith a number of longitudinal fluid passageways, and said screen being substantially coextensive with the perforated length of said centerpipe but extending above the upper end of the centerpipe and forming therewith an annular particle retaining space;
   (4) horizontal peripheral fluid distribution means disposed in the lower portion of the vessel;
   (5) a plurality of upwardly directed circumferentially spaced nozzles attached to said fluid distribution means, each of said nozzles communicating directly with one of said longitudinal passageways;
   (6) an annular baffle member extending inwardly from said vertical wall across the top of said screen and sealing off the upper ends of said longitudinal passageways;
   (7) a second baffle member spaced below the first-mentioned annular baffle member and extending inwardly from said particle retaining screen across said particle retaining space, said second baffle member comprising an imperforate horizontal annular plate having an axially positioned open-ended vertical casing extending upwardly from the plate to a point above the upper end of said centerpipe with a perforated closure member being disposed across the casing above the centerpipe;

(8) a vertical annular baffle extending upwardly from said horizontal annular plate through the opening of said first-mentioned annular baffle member and spaced from said vertical casing; and (9) conduit means separately connecting said centerpipe and said fluid distribution means with the exterior of said vessel.

References Cited in the file of this patent

UNITED STATES PATENTS

| | | |
|---|---|---|
| 2,483,923 | Morrey | Oct. 4, 1949 |
| 2,680,675 | Groebe | June 8, 1954 |
| 2,683,654 | Bergman | July 13, 1954 |
| 2,734,804 | Courthope et al. | Feb. 14, 1956 |
| 2,997,374 | Lavander et al. | Aug. 22, 1961 |
| 3,006,740 | Maggio | Oct. 31, 1961 |
| 3,100,141 | Donovan | Aug. 6, 1963 |